US011433498B2

(12) United States Patent
Laurent et al.

(10) Patent No.: US 11,433,498 B2
(45) Date of Patent: Sep. 6, 2022

(54) METHOD FOR MONITORING A MILLING METHOD

(71) Applicant: CENTRE TECHNIQUE DES INDUSTRIES MECANIQUES ET DU DECOLLETAGE, Cluses (FR)

(72) Inventors: Patrice Laurent, Viuz en Sallaz (FR); Roger Busi, Saint Laurent (FR)

(73) Assignee: CENTRE TECHNIQUE DES INDUSTRIES MECANIQUES ET DU DECOLLETAGE, Cluses (FR)

( * ) Notice: Subject to any disclaimer, the term of this patent is extended or adjusted under 35 U.S.C. 154(b) by 0 days.

(21) Appl. No.: 15/565,781

(22) PCT Filed: Apr. 13, 2016

(86) PCT No.: PCT/EP2016/058140
§ 371 (c)(1),
(2) Date: Oct. 11, 2017

(87) PCT Pub. No.: WO2016/166173
PCT Pub. Date: Oct. 20, 2016

(65) Prior Publication Data
US 2018/0117725 A1 May 3, 2018

(30) Foreign Application Priority Data

Apr. 13, 2015 (FR) ....................... 1500755

(51) Int. Cl.
*B23Q 17/09* (2006.01)
*G05B 19/4065* (2006.01)
*B23Q 3/157* (2006.01)

(52) U.S. Cl.
CPC ......... *B23Q 17/0995* (2013.01); *B23Q 3/157* (2013.01); *B23Q 17/09* (2013.01);
(Continued)

(58) Field of Classification Search
CPC ............... Y10T 483/13; Y10T 483/136; Y10T 183/138; Y10T 409/303752; Y10T 483/10;
(Continued)

(56) References Cited

U.S. PATENT DOCUMENTS 3,784,798 A     1/1974  Beadle et al.
3,986,010 A  * 10/1976  Lankford ........... G05B 19/4163
                                                    700/195
(Continued)

FOREIGN PATENT DOCUMENTS

DE      44 05 660 A1      8/1995
SU      1268315 A1   *  11/1986
(Continued)

OTHER PUBLICATIONS

International Search Report dated Jul. 5, 2016, in PCT/EP2016/058140 filed Apr. 13, 2016.

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A method is provided for monitoring a milling method for a milling machine provided with a milling tool comprising cutting teeth, the method including: determining measured values of a first parameter corresponding to a bending of the milling tool as a function of a second parameter corresponding to an angle of rotation of the milling tool in a rotating frame of reference of the milling tool and analyzing the measured values as a function of at least one monitoring criterion.

7 Claims, 5 Drawing Sheets

Figure 1:
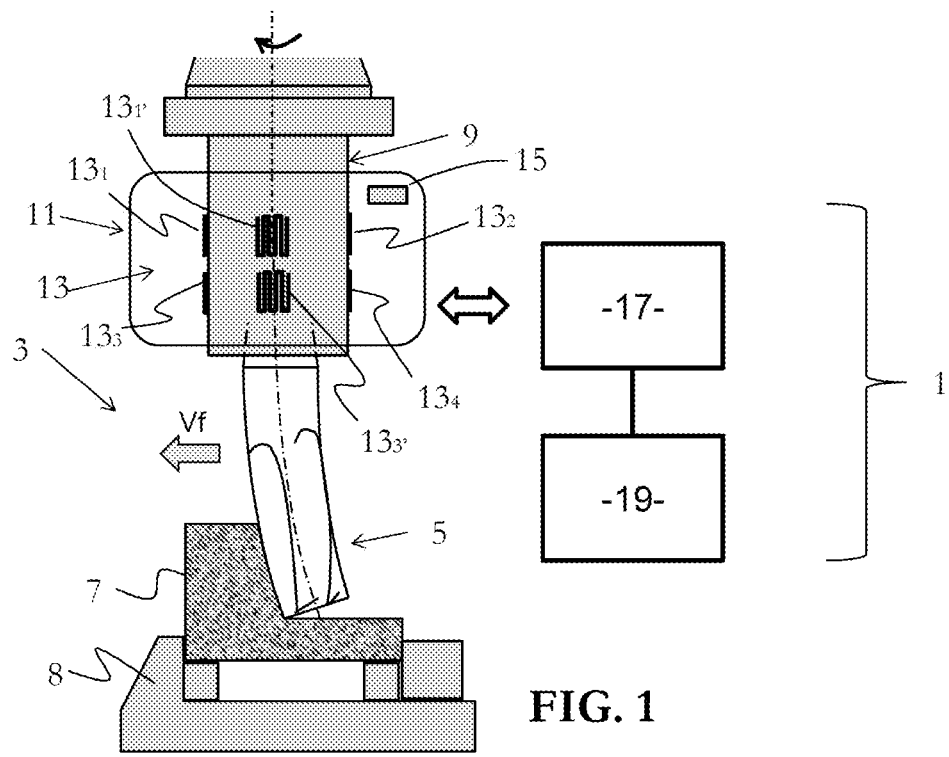

(52) U.S. Cl.
CPC .... *G05B 19/4065* (2013.01); *B23Q 2717/006* (2013.01); *G05B 2219/37355* (2013.01); *G05B 2219/49186* (2013.01); *Y10T 409/303752* (2015.01); *Y10T 483/136* (2015.01)

(58) Field of Classification Search
CPC ........... G05B 2219/48186; G05B 2219/49169; B23Q 17/09–0952; B23Q 17/0995; B23Q 17/2452; B23Q 17/2457; B23C 2270/06
USPC .............. 700/175; 483/7, 10, 11, 1; 409/131
See application file for complete search history.

(56) References Cited

U.S. PATENT DOCUMENTS

| | | | | |
|---|---|---|---|---|
| 4,214,191 | A | * | 7/1980 | Watanabe .............. B23Q 17/09 318/561 |
| 4,417,489 | A | | 11/1983 | Liu |
| 4,802,095 | A | * | 1/1989 | Jeppsson ................ B23Q 17/09 318/572 |
| 2004/0029690 | A1 | * | 2/2004 | Takaku ................ B23Q 17/003 483/7 |
| 2013/0268110 | A1 | | 10/2013 | Hamada |
| 2015/0127139 | A1 | * | 5/2015 | Bolin ................. G05B 19/4065 700/173 |
| 2015/0261207 | A1 | * | 9/2015 | Wunderlich ....... B23Q 17/0966 700/175 |

FOREIGN PATENT DOCUMENTS

| | | | | |
|---|---|---|---|---|
| WO | WO-8201428 A1 | * | 4/1982 | ........... G05B 19/231 |
| WO | WO-2013043102 A1 | * | 3/2013 | ........... G05B 19/404 |

\* cited by examiner

METHOD FOR MONITORING A MILLING METHOD

The present invention relates to the field of machining, and more specifically to the field of milling.

Milling is the removal of material in the form of swarf resulting from the combination of two movements: the rotation of the cutting tool on one hand and the forward movement of the part being machined or of the cutting tool on the other hand.

Modern milling machines are fitted with a digital control unit that is used to form a comprehensive range of shapes, including complex shapes.

During an industrial milling process, a large number of parts are made using a single milling tool.

To enhance productivity and quality, it is important to know when to replace the milling tool once same no longer satisfies the minimum requirements in terms of cutting or symmetry, for example, to form parts that satisfy predetermined surface-quality and dimensional requirements.

Even if a milling tool is replaced with a new milling tool, the new milling tool may have a manufacturing defect that prevents good parts from being manufactured, i.e. parts having the required dimensions and an acceptable surface condition.

Nowadays, the milling tool is replaced as a function of the experience of the operator of the milling machine. Nonetheless, for safety reasons, operators are bound to change milling tools long before same are worn out and are causing defects in the machined parts.

This has a negative effect on overall productivity, both as a result of the cost of a new milling tool and because replacement of a milling tool requires the milling machine to be stopped, which reduces production speed.

Furthermore, if a new milling tool has a defect, said defect is often only discovered after a certain number of parts have been manufactured, said parts subsequently being discarded. This also engenders a cost, which reduces the productivity of the industrial process.

If a milling tool is worn out and replaced too late, the parts produced may have defects, and moreover the consumption of electrical energy by a milling machine with a worn-out milling tool increases significantly.

To overcome these drawbacks, it is proposed to monitor the milling processes in real time for example using a Kistler (registered trademark) measurement plate to measure the cutting forces in three directions of a Cartesian frame of reference: x—the axis of the forward movement, y—the axis perpendicular to the forward movement, and z—the axis of rotation of the milling tool.

However, the analysis of measurements is complex and difficult and for example does not usually make it possible to detect dissymmetry of the milling tool.

According to another approach described in DE 9014037 or U.S. Pat. No. 8,113,066, the milling head is fitted with an adapter to measure the torsional moment of the milling tool to monitor the milling tool. However, no simple analysis method for determining the wear of the milling tool that does not require the milling tool to be changed is proposed.

The present invention is intended to propose an optimized method for monitoring a milling method.

For this purpose, the invention relates to a method for monitoring a milling method for a milling machine provided with a milling tool comprising cutting teeth, characterized in that it comprises the following steps:

determining measured values of a first parameter corresponding to a bending of the milling tool as a function of a second parameter corresponding to the angle of rotation of the milling tool in a rotating frame of reference of the milling tool, and analyzing the measured values as a function of at least one monitoring criterion.

Indeed, the inventors of the present invention have discovered that wear or a defect in a milling tool changes the measured values of the bending moment of the milling tool. Monitoring a parameter linked to the bending moment of the milling tool therefore makes it possible to quantitatively detect the wear of a milling tool during operation. Furthermore, thresholds that are not to be passed can be defined so as not to compromise the quality of the parts to be machined, and therefore for example to warn an operator to replace the milling tool or to command the automatic replacement of the milling tool in a milling machine fitted with an automatic milling-tool replacement module.

The machining method according to the invention can also have one or more of the following aspects, individually or in combination.

According to one aspect, the maximum measured value of the first parameter is determined in a range of angular values corresponding to one cutting tooth in a rotating frame of reference of the milling tool, and a monitoring criterion includes the temporal evolution of the maximum measured value of the first parameter.

According to another aspect, the maximum measured value is determined for each cutting tooth of the milling tool.

According to another aspect, a monitoring criterion includes the difference in the maximum measured value of one cutting tooth compared to the other teeth.

Another monitoring criterion may include the offsetting over time of the maximum measured value of the first parameter of at least one cutting tooth in relation to the second parameter.

The minimum measured value of the first parameter may be determined in a range of angular values corresponding to one cutting tooth in a rotating frame of reference of the milling tool, and a monitoring criterion includes the temporal evolution of the minimum measured value of the first parameter.

According to another aspect, the minimum measured value is determined for each cutting tooth of the milling tool.

Another monitoring criterion may include the variation of the measured values of the first parameter for at least one value of the second parameter over several turns of the milling tool.

At least one monitoring criterion is for example compared to a predetermined threshold, and a warning signal is generated if the threshold is passed.

The predetermined threshold can be determined by a learning process.

The first parameter is for example a bending moment of the milling tool.

The second parameter is for example an angular position of the milling tool.

The invention also relates to an automatic milling method with a milling machine fitted firstly with a milling tool having cutting teeth and secondly with an automatic replacement module for the milling tool, characterized in that a monitoring method as defined above is implemented, and automatic replacement of the milling tool is commanded if at least one predetermined threshold of a monitoring criterion is passed.

The invention also relates to a device for monitoring a milling method for a milling machine provided with a milling tool comprising cutting teeth for implementing a monitoring method as defined above, characterized in that it comprises:

at least one sensor for measuring a first parameter corresponding to a bending of the milling tool as a function of a second parameter corresponding to the angle of rotation of the milling tool in a rotating frame of reference of the milling tool, and a unit for analyzing the measured values as a function of at least one monitoring criterion.

The monitoring device for example includes a milling arbor incorporating at least one measurement sensor, notably a strain gauge.

Figure 2:
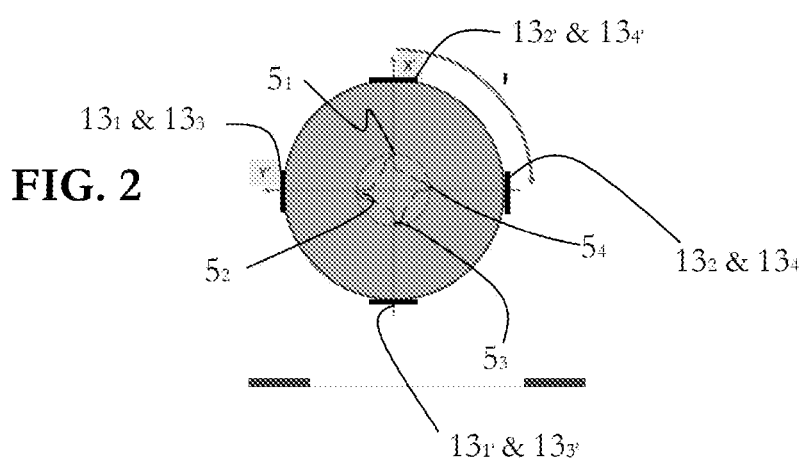
Figure 3:
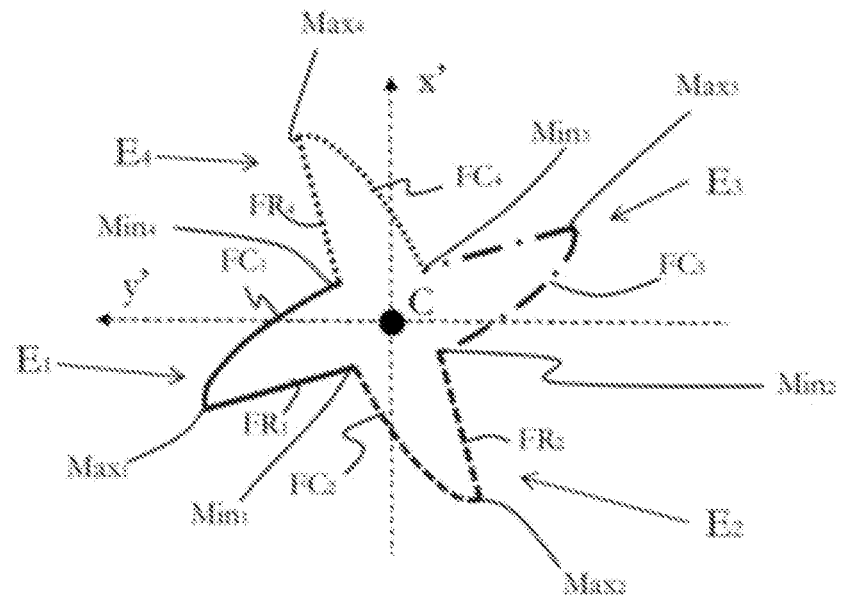
Figure 4:
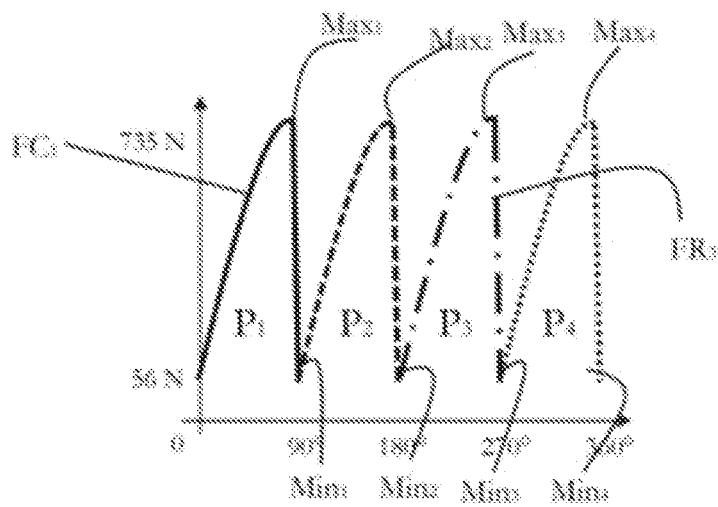
Figure 5:
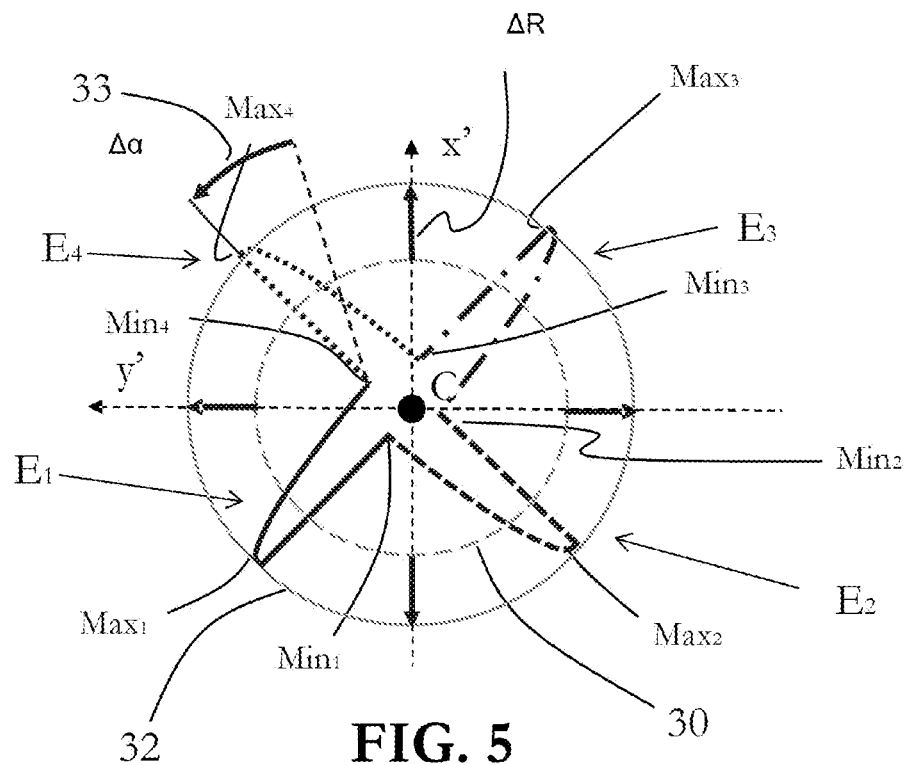
Figure 6:
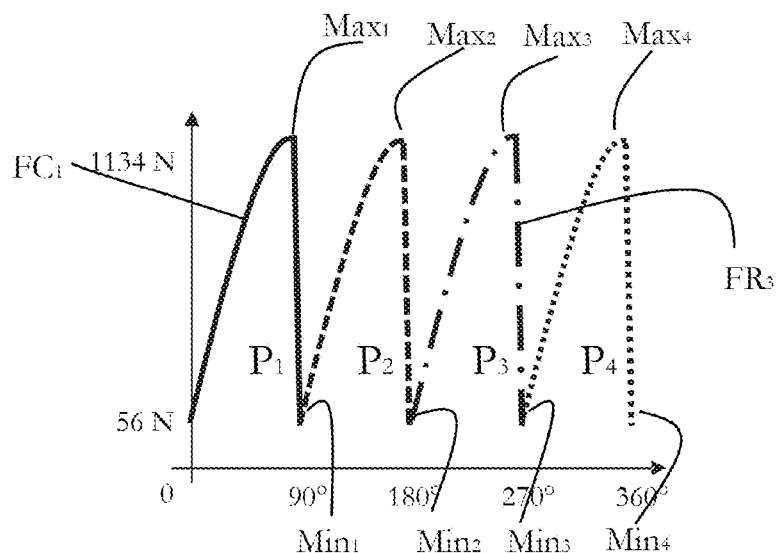
Figure 7:
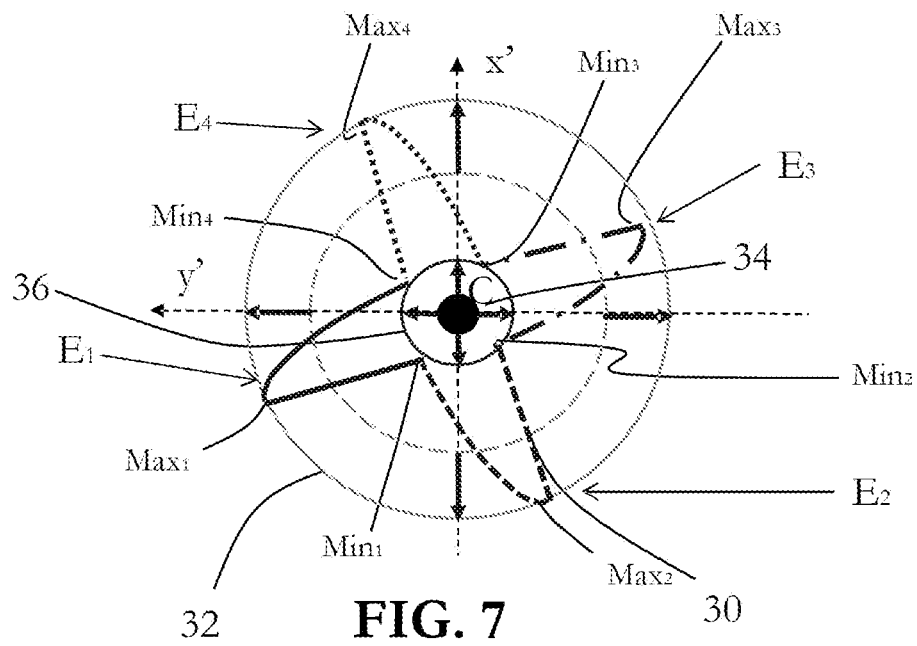
Figure 8:
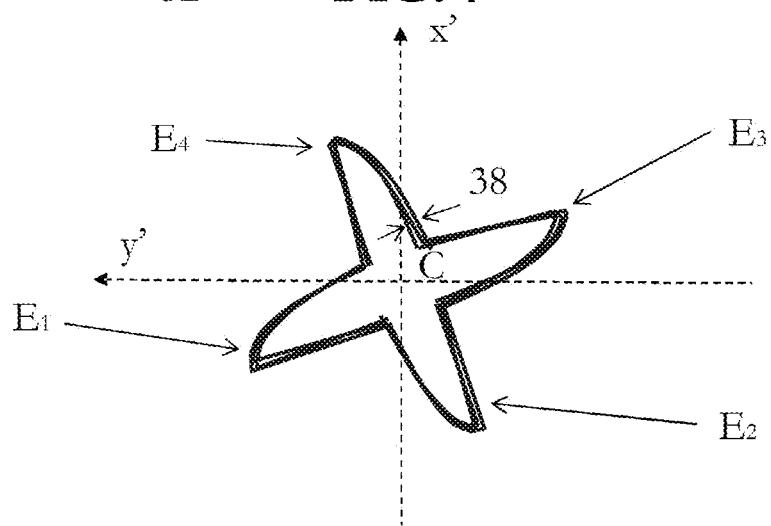
Figure 9:
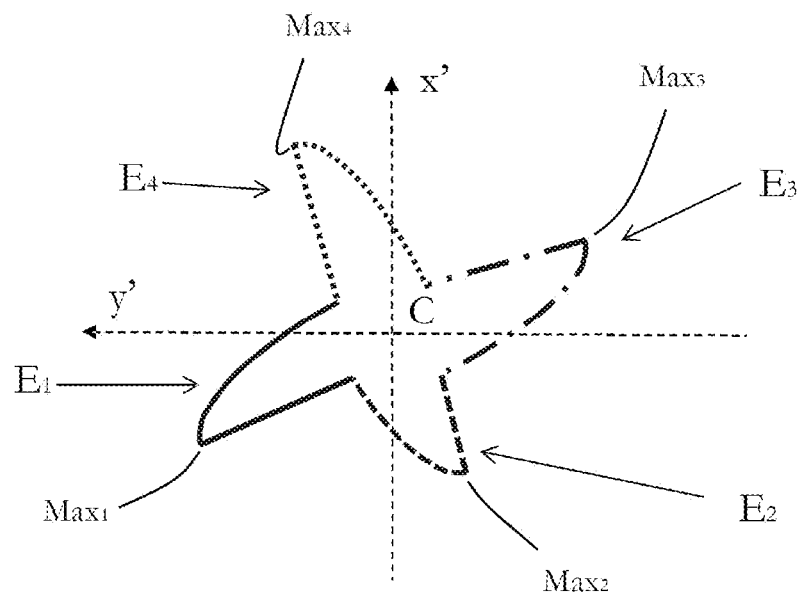
Figure 10:
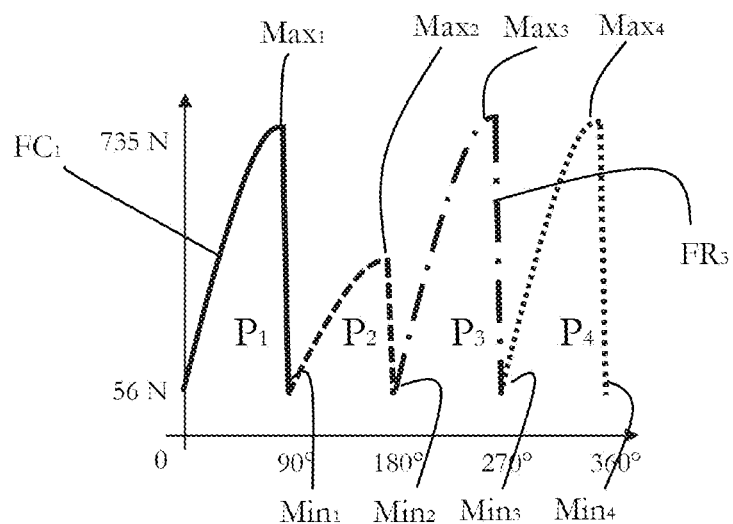

Other advantages and features are included in the description of the invention, and in the attached drawings in which:

FIG. 1 is an overview diagram of a monitoring device according to the invention for implementing a method according to the invention, FIG. 2 is an explanatory diagram of a rotating frame of reference of the milling tool, FIG. 3 is a first example of a polar diagram showing the measured values of a first parameter corresponding to a bending of the milling tool as a function of a second parameter corresponding to the angle of rotation of the milling tool, FIG. 4 is a two-dimensional diagram of FIG. 3 showing the measured values of a first parameter corresponding to a bending of the milling tool as a function of a second parameter corresponding to the angle of rotation of the milling tool, FIG. 5 is a second example of a polar diagram showing the measured values of a first parameter corresponding to a bending of the milling tool as a function of a second parameter corresponding to the angle of rotation of the milling tool, FIG. 6 is a two-dimensional diagram of FIG. 5 showing the measured values of a first parameter corresponding to a bending of the milling tool as a function of a second parameter corresponding to the angle of rotation of the milling tool, FIG. 7 is a third example of a polar diagram showing the measured values of a first parameter corresponding to a bending of the milling tool as a function of a second parameter corresponding to the angle of rotation of the milling tool, FIG. 8 is a fourth example of a polar diagram showing the measured values of a first parameter corresponding to a bending of the milling tool as a function of a second parameter corresponding to the angle of rotation of the milling tool, FIG. 9 is a fifth example of a polar diagram showing the measured values of a first parameter corresponding to a bending of the milling tool as a function of a second parameter corresponding to the angle of rotation of the milling tool, FIG. 10 is a two-dimensional diagram of FIG. 9 showing the measured values of a first parameter corresponding to a bending of the milling tool as a function of a second parameter corresponding to the angle of rotation of the milling tool.

In these figures, identical elements are indicated using the same reference signs.

The following embodiments are examples. Although the description refers to one or more embodiments, this does not necessarily mean that each reference refers to the same embodiment, or that the characteristics apply only to one embodiment. Individual characteristics of different embodiments may also be combined to provide other embodiments.

In the description, certain elements or parameters may be numbered, for example first element or second element, or first parameter and second parameter, or first criterion and second criterion, etc. In this case, such numbering is merely intended to differentiate and describe elements, parameters or criteria that are similar but not identical. This numbering does not imply priority of one element, parameter or criterion over another, and as such descriptions can be simply swapped around without thereby moving outside the scope of the present description. Furthermore, this numbering does not imply any chronological order, for example when assessing criteria.

FIGS. 1 and 2 show a device 1 for monitoring a milling method of a milling machine fitted with a milling tool 3 having cutting teeth 5, in this case for example four cutting teeth $5_1$, $5_2$, $5_3$ and $5_4$. Furthermore, FIG. 2 shows the frame of reference x', y' of the milling tool. This frame of reference is static in relation to the milling tool and rotates therewith during milling.

A part 7 to be machined is clamped in a vise 8 and the milling tool 3 rotates for example clockwise to remove material for example from a part 7 to be machined, that is for example made of metal, moving forward at a speed of advance $v_f$ (FIG. 1) and turning at a number N of revolutions per minute.

The milling tool 3 is held in an arbor 9 fitted with at least one measurement sensor 11 for measuring a first parameter corresponding to a bending of the milling tool as a function of a second parameter corresponding to the angle of rotation of the milling tool in a rotating frame of reference of the milling tool.

More specifically, the first parameter is for example a bending moment of the milling tool and the second parameter is the angular position of the milling tool. Consequently, with each 360° rotation, there is a new measured value of the first parameter, for example the bending moment of the milling tool 3, for each angular position of the milling tool 3.

This makes it possible to monitor the bending moment of the milling tool 3 very accurately, for example as a function of the angular position thereof, and it is in particular possible to monitor the cutting/milling work of each tooth 5 of the milling tool 3 individually.

The measurement sensor 11 for example comprises one or more strain gauges 13.

According to an embodiment shown in the figures, the sensor 11 includes firstly a first set of four strain gauges $13_1$, $13_2$, $13_3$ and $13_4$ and secondly a second set of four strain gauges $13_{1'}$, $13_{2'}$, $13_{3'}$ and $13_{4'}$. The first set comprises two first strain gauges $13_1$ and $13_3$, in which one strain gauge $13_1$ is arranged on top of the other strain gauge $13_3$, and two second strain gauges $13_2$ and $13_4$ that are offset by 180°, the strain gauge $13_1$ being arranged to face the strain gauge $13_2$ and the strain gauge $13_3$ being arranged to face the strain gauge $13_4$.

The second set of four strain gauges $13_{1'}$, $13_{2'}$, $13_{3'}$ and $13_{4'}$ is assembled in a manner similar to the first set, but offset by 90° (see FIG. 2). Thus, the second set comprises two first strain gauges $13_{1'}$ and $13_{3'}$, in which one strain gauge $13_{1'}$ is arranged on top of the other strain gauge $13_{3'}$, and two second strain gauges $13_{2'}$ and $13_{4'}$ that are offset by 180°, the strain gauge $13_{1'}$ being arranged to face the strain gauge $13_{2'}$ and the strain gauge $13_{3'}$ being arranged to face the strain gauge $13_{4'}$.

The strain gauges $13_1$, $13_2$, $13_3$ and $13_4$ of the first set are linked electrically via a Wheatstone measurement bridge to supply a first measurement signal.

The strain gauges $13_{1'}$, $13_{2'}$, $13_{3'}$ and $13_{4'}$ of the second set are also linked electrically via a Wheatstone measurement bridge to supply a second measurement signal.

These strain gauges 13 are linked to a first electronic wireless processing and transmission unit 15 carried on the arbor 9.

Naturally, sensors other than strain gauges can be used to measure a first parameter corresponding to a bending of the milling tool without thereby moving outside the scope of the present invention.

The number of strain gauges in the measurement sensor 11 can also be increased.

The first electronic unit 15 communicates the wireless measured values to a second stationary electronic unit 17 for receiving and processing measured values, notably from a signal processing perspective. The second electronic unit is linked to a unit 19 for analyzing the measured values as a function of at least one monitoring criterion.

Naturally, these units 15, 17 and 19 may be formed using microprocessors or ASICs, and have memories and processing and analysis means.

The monitoring device 1, and consequently the related method, for monitoring a milling method for a milling machine provided with a milling tool comprising cutting teeth work as follows:

In a first step, measured values are determined for a first parameter corresponding to a bending of the milling tool as a function of a second parameter corresponding to the angle of rotation of the milling tool in a rotating frame of reference of the milling tool.

In a second step, the measured values are analyzed as a function of at least one monitoring criterion.

FIG. 3 is a polar diagram in the rotating frame of reference based on the coordinates x', y' of the milling tool showing a first example measurement for a new milling tool with four cutting teeth $5_i$ (i=1 to 4) with no defects showing the measured values of a first parameter corresponding to a bending of the milling tool, in this case a bending moment as a function of a second parameter corresponding to the angle of rotation of the milling tool, in this case the angular position of the milling tool.

The center of the polar diagram is indicated using reference sign C and the measured values of the bending moments are shown by the distance from the center and as a function of the angular position.

Thus, the polar diagram shows four protrusions $E_1$, $E_2$, $E_3$ and $E_4$ that are the same shape but that are angularly offset by 90° respectively. Each protrusion $E_i$ (i=1 to 4) corresponds to the profile of the bending moment left by each cutting tooth $5_i$ (i=1 to 4) of the milling tool 3. To facilitate identification of the measurements corresponding to a given cutting tooth $5_i$ in the diagrams and figures below, the measurements for the tooth $5_1$ corresponding to the protrusion $E_1$ have been drawn using an unbroken line, the measurements for the tooth $5_2$ corresponding to the protrusion $E_2$ have been drawn using a dashed line, the measurements for the tooth $5_3$ corresponding to the protrusion $E_3$ have been drawn using a dot-dash line and the measurements for the tooth $5_4$ corresponding to the protrusion $E_4$ have been drawn using a dotted line.

Each protrusion $E_i$ (i=1 to 4) has a cutting flank $FC_i$ (i=1 to 4) showing how the tooth $5_i$ penetrates the material part 7 during rotation of the milling tool 3, which progressively increases the bending moment up to a maximum bending moment $Max_i$ (i=1 to 4), then a return flank $FR_i$ (i=1 to 4) when the tooth $5_i$ comes out of the material, which results in a sudden release of the bending moment.

As shown in FIG. 3, the bending moment never drops to zero (which would be represented by the measurement curve touching the center C), but there are four minimum values for the bending moment $Min_i$ (i=1 to 4). The minimum bending moment $Min_i$ is reached just before the cutting tooth $5_{1+i}$ penetrates the material of the part 7 to be machined.

FIG. 4 is another representation of FIG. 3 in the form of a two-dimensional diagram showing the measured values of the bending moment of the milling tool as a function of the angular position of the milling tool 3. In this case, the measurements coming from the two Wheatstone measurement points are for example combined to obtain a bending resultant of the milling tool 3.

In this figure, each peak $P_1$, $P_2$, $P_3$ and $P_4$ corresponds to one of four protrusions $E_1$, $E_2$, $E_3$ and $E_4$, and therefore to a specific tooth $5_i$. The line of each peak $P_i$ corresponds to the line of the corresponding protrusion $E_i$. The values $Max_i$ and $Min_i$ are also shown, along with certain flanks $FC_i$ and $FR_i$ (i=1 to 4), which are the same in FIGS. 3 and 4.

Consequently, for a new milling tool 3 with no defects, the shape of each of the bending moment profiles of the cutting teeth 5 is nearly identical. Indeed, when milling begins, the milling tool with the teeth 5 thereof is perfectly regular.

It is also true that each cutting tooth 5, corresponds to a range of angular values in a rotating frame of reference of the milling tool. Thus, the tooth $5_1$ corresponds for example to the range from 50° to 140°, the tooth $5_2$ corresponds for example to the range from 140° to 230°, the tooth $5_3$ corresponds for example to the range from 230° to 320°, and the tooth $5_4$ corresponds for example to the range from 320° to 50°.

As the milling work progresses, the cutting teeth 5 are gradually blunted and worn down, and certain defects may appear.

The inventors of the present invention have discovered that wear and defects appearing on the milling tool 3 may have a range of different effects, and analyzing the measured values as a function of at least one monitoring criterion makes it possible to reliably quantify the wear of the milling tool 3 or a defect, thereby enabling a worn out or defective milling tool 3 to be replaced in good time.

FIG. 5 is a second example of a polar diagram showing the measured values of the bending moments of the milling tool 3 as a function of the angular position of the milling tool 3. In this case, the milling tool 3 has already been used for milling/machining for a given period of time, resulting in a degree of wear of the milling tool 3, for example blunting of the cutting edges of the teeth 5.

The maximum values $Max_i$ are further away from the center C because the bending moment has increased. The milling tool 3 therefore needs to apply more force to remove material from the part 5.

A circle 30 drawn using a dotted line, the diameter of which corresponds to a circle passing through all of the maximum values $Max_i$ for a new milling tool with no defects is shown for the sake of comparison.

It can be clearly seen that the circle 32 for a milling tool with a certain degree of wear is larger than the circle 30 by the value $\Delta R$.

The same change in the profiles of the bending moments for each cutting tooth $5_i$ can be seen in a two-dimensional representation in FIG. 6, this representation being similar to the representation in FIG. 4.

Thus, within a range of angular values corresponding to one cutting tooth $5_i$ in a rotating frame of reference of the milling tool, it is possible to determine the maximum measured value $Max_i$ of the bending moment and a first monitoring criterion is for example the temporal evolution of the maximum measured value $Max_i$ of the bending moment for at least one cutting tooth 5, or all of the cutting teeth 5.

When a predetermined threshold is passed for one or all of the teeth $5_i$, a warning can be triggered to inform the operator of the milling machine that the milling tool 5 needs to be changed. If the milling machine has an automatic replacement module for the milling tool, the warning signal can trigger a command to automatically replace the milling tool if at least one predetermined threshold of a monitoring criterion is passed, such as a maximum value of the bending moment of the milling tool 3 for one or all of the cutting teeth 5.

In general, the predetermined threshold for one of the monitoring criteria described in the present invention depends significantly on the tool-material pair, i.e. the milling tool itself, the geometry thereof, the surface coatings thereof, to mention just some of the parameters of the milling tool and of the material to be machined. A learning process may be used to determine the threshold, i.e. a milling process is launched and the related values are measured until it is determined that the machined parts no longer satisfy the related quality requirements, notably in terms of surface condition or dimensions, and the threshold is set just beneath this value.

In an alternative approach, the predetermined threshold is for example set at a variation of 30%, 40% or 50% in the measured values of the monitoring criterion used (as a function of the safety range that the operator wishes to implement). Thus, if the maximum bending moment increases by 50%, this means that the milling tool 3 has suffered too much wear, and the milling tool 3 needs to be changed.

The inventors have also noted that not only do the maximum values $Max_i$ move away from the center C, indicating a greater bending moment, but that a second monitoring criterion is also present that is the offsetting over time of the maximum measured value of the bending moment of at least one cutting tooth in relation to angular position.

As shown in FIG. 4, the maximum value of the bending moment $Max_1$ for a cutting tooth $5_1$ occurs at approximately 120°, while FIGS. 5 and 6 show that the maximum value of the bending moment $Max_1$ for the cutting tooth $5_1$ occurs at approximately 140°. It can thus be seen that the angular ranges corresponding to each tooth are offset in this case by $\Delta\alpha$ of approximately 20° (reference sign 33) counterclockwise in the polar diagram in FIG. 5. This offsetting 33 can be attributed to an additional force of the milling tool 5 to penetrate the material 7.

This offsetting 33 is also a monitoring criterion and therefore a value that can be used to quantitatively determine the wear of a milling tool 5. If this offsetting 33 passes a predetermined threshold, for example 10° or 15° or 20°, a warning is triggered for the operator or, for a milling machine with an automatic replacement module, a command is triggered to replace the milling tool 5.

FIG. 7 is similar to FIG. 5.

FIG. 7 is another example of a polar diagram showing the measured values of the bending moments of the milling tool 3 as a function of the angular position of the milling tool 3. Also in this case, the milling tool 3 has already been used for milling/machining for a given period of time, resulting in a degree of wear of the milling tool 3, for example blunting of the cutting edges of the teeth 5.

In this case, it can be seen that the minimum values $Min_i$ are further away from the center C. A circle 34 drawn using a dotted line, the diameter of which corresponds to a circle passing through all of the minimum values $Min_i$ for a new milling tool with no defects is shown for the sake of comparison.

It can be clearly seen that a circle 36 for a milling tool with a certain degree of wear is larger than the circle 34.

Consequently, an analysis of the evolution of the measured values of the bending moment may involve determining the minimum measured value of the bending moment for one or all of the cutting teeth 5 and a third monitoring criterion is for example the temporal evolution of the minimum measured value of the bending moment for one or all of the cutting teeth 5. If this value passes a predetermined threshold for one or all of the cutting teeth 5, a warning is triggered or the milling tool is replaced automatically, depending on the milling machine.

FIG. 8 is a fourth example of a polar diagram showing the measured values of a bending moment over several rotations of the milling tool as a function of the angular position of the milling tool.

Another monitoring criterion is for example the variation of the measured values of the first parameter for at least one value of the second parameter over several turns of a milling tool.

This variation represents instability in the bending behavior of the milling tool during machining and is an assessment criteria of the machined surface and of the defects related to machine (waviness in flank milling). The variation can for example be assessed in the form of a standard deviation 38 or a variance. If for example the standard deviation passes a given threshold, a warning is given to the operator to change the tool or, in an entirely automated milling machine, a command to replace the milling tool is triggered.

FIG. 9 is a fifth example of a polar diagram showing the measured values of a bending moment of the milling tool 3 as a function of the angular position thereof and FIG. 10 is a two-dimensional diagram of FIG. 9.

FIGS. 9 and 10 show that the maximum $Max_2$ of the second cutting tooth $5_2$ is less than the maximum $Max_i$ (i=1, 3, 4) of the other cutting teeth $5_i$ (i=1, 3, 4). This is a dissymmetry of the cutting tool 3 that may have a negative effect on the quality of the milled surface and result in significant instability of the milling tool 3.

Another monitoring criterion can therefore be the difference in the maximum measured value of one cutting tooth compared to the other teeth.

If such dissymmetry, which can also result in manufacturing defects or partial breakage of a cutting tooth during machining, is detected, a warning is sent to change the milling tool or to command replacement of the milling tool.

It can therefore be seen that the method according to the invention makes it possible to quantitatively determine the wear or defectiveness of a milling tool 3 and to replace same.

One advantage of this quantitative method is that the milling tool 3 is not replaced too early or too late.

Indeed, if the milling tool 3 is replaced too early for safety reasons, there is a cost for replacing the milling tool itself as well as a drop in production speed.

If the replacement is carried out too late, some of the parts machined have to be rejected for failing to satisfy the related dimensional or surface-quality requirements.

Applying the method according to the invention to a milling machine with a replacement module improves productivity.

The invention claimed is:

1. A method for monitoring a milling method for a milling machine provided with a milling tool comprising a plurality of cutting teeth, wherein the milling tool rotates about a tool rotation axis during the milling method, the method for monitoring comprising:
   measuring values of a bending moment of the milling tool as a function of an angular position of the milling tool in a rotating frame of reference of the milling tool, the rotating frame of reference being a frame of reference representing angular position about the tool rotation axis;
   analyzing the measured values of the bending moment as a function of at least one monitoring criterion; and
   issuing an alert to replace the milling tool when the at least one monitoring criterion is greater than a predetermined threshold for the at least one monitoring criterion,
   wherein one of the at least one monitoring criterion corresponds to:
      an offset, the offset being a value representing a change in angular position of a maximum measured value of the bending moment for at least one of the plurality of cutting teeth, the change in angular position being an angular shift from a first angular position of the milling tool in the rotating frame of reference of the milling tool at which the maximum measured value of the bending moment is measured prior to the milling tool having any defects from milling to a second angular position of the milling tool in the rotating frame of reference of the milling tool at which the maximum measured value of the bending moment is measured after the milling tool has been used for milling for a period of time.

2. The monitoring method according to claim 1, further comprising:
   determining a minimum measured value of the bending moment in a range of angular values corresponding to one cutting tooth of the plurality of cutting teeth in the rotating frame of reference of the milling tool,
   wherein another one of the at least one monitoring criterion corresponds to a temporal evolution of the minimum measured value of the bending moment at a selected angle of rotation of the milling tool over time.

3. The monitoring method as claimed in claim 2, wherein the minimum measured value is determined for each cutting tooth of the plurality of cutting teeth of the milling tool.

4. The monitoring method according to claim 1, wherein another one of the at least one monitoring criterion corresponds to a variation of the measured values of the bending moment for at least one value of the angular position of the milling tool over a plurality of complete turns of the milling tool.

5. The monitoring method as claimed in claim 1, wherein the predetermined threshold is determined by a learning process.

6. The monitoring method according to claim 1, wherein the measuring is performed by a plurality of sensors.

7. The monitoring method according to claim 6, wherein the plurality of sensors includes strain gauges provided on an arbor which holds the milling tool.

* * * * *